US008200681B2

(12) United States Patent
Hedge et al.

(10) Patent No.: US 8,200,681 B2
(45) Date of Patent: Jun. 12, 2012

(54) COLLABORATIVE MEDIA RECOMMENDATION AND SHARING TECHNIQUE

(75) Inventors: Rajesh Hedge, Redmond, WA (US); Zicheng Liu, Bellevue, WA (US); Li-wei He, Redmond, WA (US); Philip Chou, Bellevue, WA (US); Christopher Meek, Kirkland, WA (US)

(73) Assignee: Microsoft Corp., Redmond, WA (US)

( * ) Notice: Subject to any disclaimer, the term of this patent is extended or adjusted under 35 U.S.C. 154(b) by 528 days.

(21) Appl. No.: 11/843,129

(22) Filed: Aug. 22, 2007

(65) Prior Publication Data
US 2009/0055377 A1 Feb. 26, 2009

(51) Int. Cl.
*G06F 7/00* (2006.01)
*G06F 17/30* (2006.01)
(52) U.S. Cl. ...................................... 707/758
(58) Field of Classification Search ............. 707/758
See application file for complete search history.

(56) References Cited

U.S. PATENT DOCUMENTS

| | | | | |
|---|---|---|---|---|
| 6,372,974 | B1 * | 4/2002 | Gross et al. | 84/609 |
| 6,728,756 | B1 | 4/2004 | Ohkado | |
| 7,081,579 | B2 * | 7/2006 | Alcalde et al. | 84/608 |
| 7,143,939 | B2 | 12/2006 | Henzerling | |
| 7,516,225 | B2 * | 4/2009 | Yoshida | 709/228 |
| 7,519,584 | B2 * | 4/2009 | Matsuda et al. | 1/1 |
| 7,685,204 | B2 * | 3/2010 | Rogers | 707/770 |
| 7,756,880 | B2 * | 7/2010 | Sighart et al. | 707/751 |
| 2002/0161865 | A1 | 10/2002 | Nguyen | |
| 2003/0014407 | A1 * | 1/2003 | Blatter et al. | 707/6 |
| 2004/0199525 | A1 * | 10/2004 | Matsuda et al. | 707/100 |
| 2004/0242207 | A1 | 12/2004 | Chi | |
| 2005/0071045 | A1 * | 3/2005 | Clini | 700/231 |
| 2005/0080673 | A1 * | 4/2005 | Picker et al. | 705/14 |
| 2005/0097137 | A1 * | 5/2005 | Kaiser et al. | 707/104.1 |
| 2005/0160270 | A1 | 7/2005 | Goldberg et al. | |
| 2005/0165779 | A1 * | 7/2005 | Kaiser et al. | 707/6 |
| 2005/0286546 | A1 | 12/2005 | Bassoli et al. | |
| 2005/0289066 | A1 * | 12/2005 | Weare | 705/51 |
| 2006/0029093 | A1 * | 2/2006 | Van Rossum | 370/432 |
| 2006/0111801 | A1 * | 5/2006 | Weare et al. | 700/94 |
| 2006/0166740 | A1 | 7/2006 | Sufuentes | |
| 2006/0195790 | A1 * | 8/2006 | Beaupre et al. | 715/727 |
| 2006/0265349 | A1 * | 11/2006 | Hicken | 707/200 |

(Continued)

OTHER PUBLICATIONS

Hakansson, Maria et. al. "facilitating mobile music sharing and social interaction with Push!Music". Jan. 2007. Proceedings of the 40th Annual Hawaii International Conference on System Sciences table of contents. p. 87. (now annotated with paragraph numbers and with page's #1-10).*

Håkansson, M., M. Rost, M. Jacobsson, L. E. Holmquist, Facilitating mobile music sharing and social interaction with Push!Music, 40th Annual Hawaii Int'l Conf. on Sys. Sciences (HICSS'07), 2007, pp. 87b.

(Continued)

*Primary Examiner* — John Cottingham
*Assistant Examiner* — Michael Pham
(74) *Attorney, Agent, or Firm* — Lyon & Harr, LLP; Katrina A. Lyon (57) ABSTRACT

A media recommendation and sharing technique that employs agents on media players/devices to expand the scope of media sharing scenarios. The technique assists a user in discovering media items, such as, for example, music, recordings, play lists, pictures, video games, on nearby media players or devices (devices which are capable of receiving, storing and playing media) which are interesting to the user. The collaborative media recommendation and sharing technique contemporaneously determines a user's media preferences based on media stored on a pair of media devices and recommends media for potential sharing based on these determined user preferences.

17 Claims, 9 Drawing Sheets

U.S. PATENT DOCUMENTS

| | | | |
|---|---|---|---|
| 2006/0288074 A1 | 12/2006 | Rosenberg | |
| 2007/0021142 A1 | 1/2007 | Byeon et al. | |
| 2007/0106656 A1* | 5/2007 | Gutta | 707/5 |
| 2007/0168360 A1* | 7/2007 | Matsuda et al. | 707/10 |
| 2007/0208735 A1* | 9/2007 | Matsuda et al. | 707/5 |
| 2007/0220552 A1* | 9/2007 | Juster et al. | 725/46 |
| 2008/0222126 A1* | 9/2008 | To | 707/5 |
| 2008/0250067 A1* | 10/2008 | Svendsen | 707/104.1 |
| 2008/0257134 A1* | 10/2008 | Oppenheimer | 84/609 |

OTHER PUBLICATIONS

Bassoli, A., J. Moore, and S. Agamanolis, tunA: Local music sharing with handheld Wi-Fi devices, Fifth Wireless World Conf., University of Surrey, UK, Jul. 15-16, 2004.

Baumann, S., A. Bassoli, B. Jung, M. Wisniowski, BluetunA: Let your neighbor know what music you like, CHI2007 Interactivity Track, San Jose, USA, May 2007.

* cited by examiner

COLLABORATIVE MEDIA RECOMMENDATION AND SHARING TECHNIQUE

BACKGROUND

With the introduction of media players that can interact with each other and the move towards social networking, it becomes desirable to make it easy for the users of these media players to collaborate with others to exchange media, such as, for example, music, play lists and video games.

Currently players equipped with access to limited range wireless networks, such as, for example, Wi-Fi and Bluetooth, allow limited sharing of media items such as, for example, songs, recordings, play lists and pictures with other media players over a wireless connection. Typically, such transfers are manually initiated and controlled by the users themselves. For example, if a user wants to share a song with a friend, the user typically picks the song they want to share and manually sends it to their friend's media player over a limited range wireless network. While this mechanism is simple and intuitive, it limits the amount of media that can be potentially shared between two friends. It is also makes it difficult to initiate media sharing between two strangers. Furthermore, it does not support media sharing between a store (for example, a coffee shop) and its customers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present collaborative media recommendation and sharing technique assists a user in discovering media items, such as, for example, music, recordings, play lists, pictures, video games, on nearby media players or devices (devices which are capable of receiving, storing and playing media) which are interesting to the user. The collaborative media recommendation and sharing technique contemporaneously determines a user's media preferences based on media stored on a pair of media devices and recommends media for potential sharing based on these determined preferences.

The technique employs several agent-based methods ranging from semi-manual to automated ways of determining a user's media preferences, recommending media to others and also sharing this media. For example, the technique can make media recommendations based on user access patterns. It can also make recommendations of randomly selected media. In one embodiment, the present technique contemporaneously determines a user's preferences and recommends media based on matching media stored on a pair of media players. Additionally, it can make recommendations by pulling or anonymously querying nearby media players for media available for sharing.

It is noted that while the foregoing limitations in existing media sharing schemes described in the Background section can be resolved by a particular implementation of the present collaborative media recommendation and sharing technique, this is in no way limited to implementations that just solve any or all of the noted disadvantages. Rather, the present technique has a much wider application as will become evident from the descriptions to follow.

In the following description of embodiments of the present disclosure reference is made to the accompanying drawings which form a part hereof, and in which are shown, by way of illustration, specific embodiments in which the technique may be practiced. It is understood that other embodiments may be utilized and structural changes may be made without departing from the scope of the present disclosure.

DESCRIPTION OF THE DRAWINGS

The specific features, aspects, and advantages of the disclosure will become better understood with regard to the following description, appended claims, and accompanying drawings where:

DETAILED DESCRIPTION

1.0 The Computing Environment

Before providing a description of embodiments of the present collaborative media recommendation and sharing technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 1:
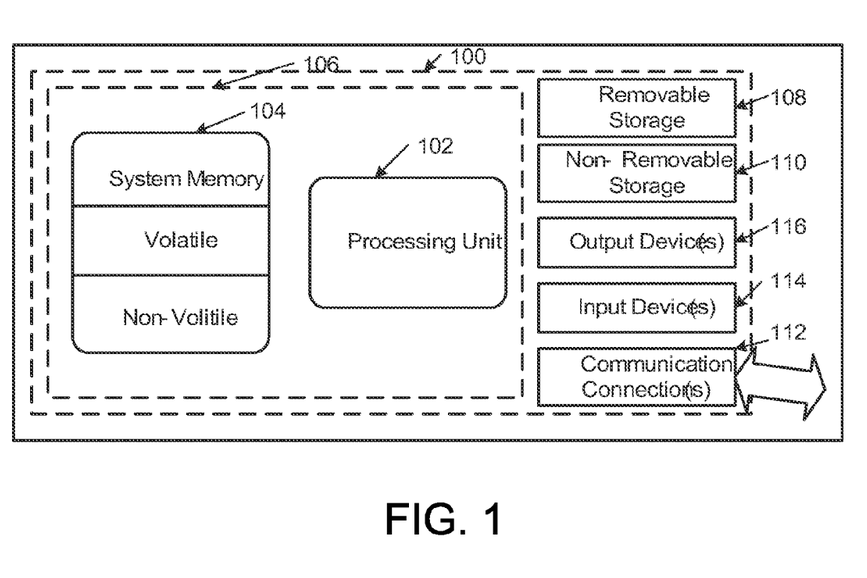
FIG. 1 is a diagram depicting a general purpose computing device constituting an exemplary system for implementing a component of the present collaborative media recommendation and sharing technique.

FIG. 1 illustrates an example of a suitable computing system environment. The computing system environment is only one example of a suitable computing environment and is not intended to suggest any limitation as to the scope of use or functionality of the present collaborative media recommendation and sharing technique. Neither should the computing environment be interpreted as having any dependency or requirement relating to any one or combination of components illustrated in the exemplary operating environment. With reference to FIG. 1, an exemplary system for implementing the present media recommendation and sharing technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 contains communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may have various input device(s) 114 such as a keyboard, mouse, microphone, pen, touch input device, and so on. Output device(s) 116 such as a display, speakers, a printer, and so on may also be included. All of these devices are well known in the art and need not be discussed at length here.

Device 100 can include a camera as an input device 114 (such as a digital/electronic still or video camera, or film/photographic scanner), which is capable of capturing an image or a sequence of images, as an input device. Further, multiple cameras could be included as input devices. The images from the one or more cameras can be input into the device 100 via an appropriate interface (not shown). However, it is noted that image data can also be input into the device 100 from any computer-readable media as well, without requiring the use of a camera.

The present collaborative media recommendation and sharing technique may be described in the general context of computer-executable instructions, such as program modules, being executed by a computing device. Generally, program modules include routines, programs, objects, components, data structures, and so on, that perform particular tasks or implement particular abstract data types. The present collaborative media recommendation and sharing technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present collaborative media recommendation and sharing technique.

2.0 Media Recommendation and Sharing Technique

The present collaborative media recommendation and sharing technique assists the user in discovering media on nearby devices which are interesting to a user. In general terms, the technique acts as an agent to recommend media from other devices for potential sharing preferably based on the user's preferences or interest space. The technique provides a recommendation agent on each media player to assist a user with media sharing. The agent communicates with other agents to determine which media, such as, for example, songs, are available for sharing based on a user's preferences. It can compute and update the user's preferences or space of interests and use that to filter out incoming media. It also can automatically rank media titles and use this ranking in determining which media titles to recommend to other devices, for example by only recommending more highly ranked media titles.

The technique employs several agent-based methods ranging from semi-manual to automated ways of recommending media to other users and also using these recommendations to share this media. For example, the present collaborative media recommendation and sharing technique can recommend media based on the following:

User media access patterns;
By randomly selecting media from a user's media player;
By matching media between media players or devices; and
By pulling media recommendations by querying other devices to determine which media they have that is designated for sharing.

It should be noted, however, the above methods are only some of the ways that the present technique can recommend media to a user. Other methods can be employed with the present collaborative media recommendation and sharing technique as well.

2.1 Exemplary Scenarios/Operating Environments

The present collaborative media recommendation and sharing technique can be employed in many ways. For example, the recommendation agent on a first user A's device can scan another known user B's device and recommend a media list from B's device to user A that matches A's interest space. After confirmation from user A, user A's recommendation agent sends a sharing request to user B's recommendation agent. User B's recommendation agent can then transmit the requested media list to user A's device after obtaining confirmation from user B.

Another possible scenario occurs when a user is in an environment where there are no other known users around. In this scenario, the recommendation agent on the user's device can scan nearby devices to find media items which match the user's interests, and recommend them to the user. Then the user can then check the recommendations (e.g., in the form of a candidate list which can be labeled with the recommending agent's user identification) and select media items that he or she is interested in downloading. At the same time, the user can allow other devices to scan his/her device to share his/her media with others. In this way, strangers are able to share media with each other anonymously without having to talk to each other in person. Note that some mechanisms may be implemented to address privacy concerns. For example, in one embodiment a user is allowed to mark those media items which he or she does not want to share with others, and the marked media items are not exposed to other devices.

Another possible operating environment in which the above-described technique can be employed is within a store that can use a recommendation agent to recommend media to its customers. For example, a media device in coffee shop can act as a media retailer to sell media to its customers. When a customer walks into a coffee shop, the customer's recommendation agent on his media device can scan the media list in the shop's media database and select the media which match the user's interests and recommend this selected media to the user/customer. Alternately, a media device in the store can scan a user's device and recommend music to that user.

2.2 Exemplary Architecture.

Figure 2:
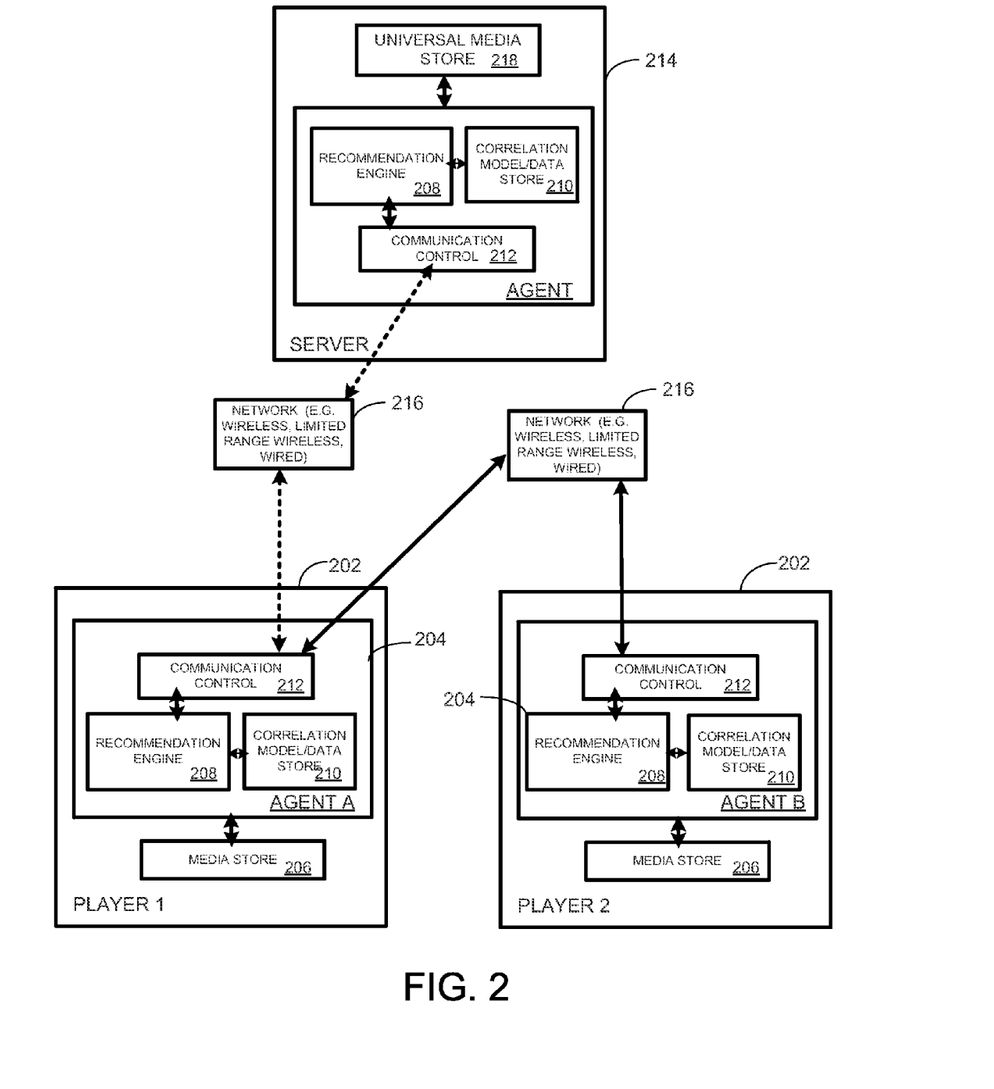
FIG. 2 is a diagram depicting an exemplary architecture of one embodiment of the present collaborative media recommendation and sharing technique.

FIG. 2 provides an exemplary architecture of one embodiment of the present collaborative media recommendation and sharing technique that supports the above discussed operating environments and scenarios. The technique employs one or more media players or similar computing devices 202, each having a recommendation agent 204 and a collection of media 206. This media 206 can include, for example, songs, movies, photographs or images, games and the like. Each recommendation agent 204 can provide to other recommendation agents recommendations as to what media that is available from other devices that a user prefers. These user preferences are also referred to as a user's "interest space". Architecturally each recommendation agent 204 has a recommendation engine 208 which computes a user's preferences or interest space, typically by using a correlation model and database 210 which contemporaneously correlates media titles or other identifiers with the information as to the user's media preferences and stores this data, and makes recommendations as to the media that can be downloaded from another media player. It should be noted that the correlation database could also be stored on a server 214 and periodically downloaded to a given media player. In one embodiment of the present technique, correlation data is based on media metadata and usage data based on media items resident on a user's media player at that time. In another embodiment, probabilistic models are used as a correlation model to determine a user's media preferences. The recommendation agent 204 also employs a communications control module 212 which governs the communication between it and other recommendation agents 204 in determining user preferences, making recommendations and transferring media based on these preferences between media players or similar computing devices 202. For example, recommendation agents may communicate regarding a user's preferences, what media a media player 202 has, or coordinate the transfer of media selected for transfer between media players based on the user's preferences. Communication occurs over a communication network 216. In one embodiment the communication between media players occurs over a limited range wireless network such as, for example, one employing WiFi or Bluetooth protocols. In other embodiments communications are conducted via a typical network such as, for example, the Internet or the intranet of an entity such as a corporation.

In one embodiment of the present collaborative media recommendation and sharing technique a server 214 can be employed, although the technique typically works in a peer-to-peer fashion between media players 202. The server 214 is also configured with a recommendation agent 204 and a universal media database 218 that contains a large store of media (for example, it may contain all of the media stored on all media players the server interacts with) 216. In one embodiment of the present technique the server 214 collects media meta data and usage data over a large number of users and correlates what types of media a user likes given they have accessed certain media items and provides this information as an input to the correlation models and databases 210 of the media players 202 for use by the recommendations engines 208 in computing user preferences and recommendations. In one embodiment, a recommendation agent can ask agents of other devices whether they have any universally popular media as determined by the server and request this media from the other devices.

The exemplary architecture of the present collaborative media recommendation and sharing technique having been discussed the following paragraphs will describe processes employing the present technique, as well as additional details regarding various possible embodiments of the present technique.

2.3 Exemplary Processes

Figure 3:
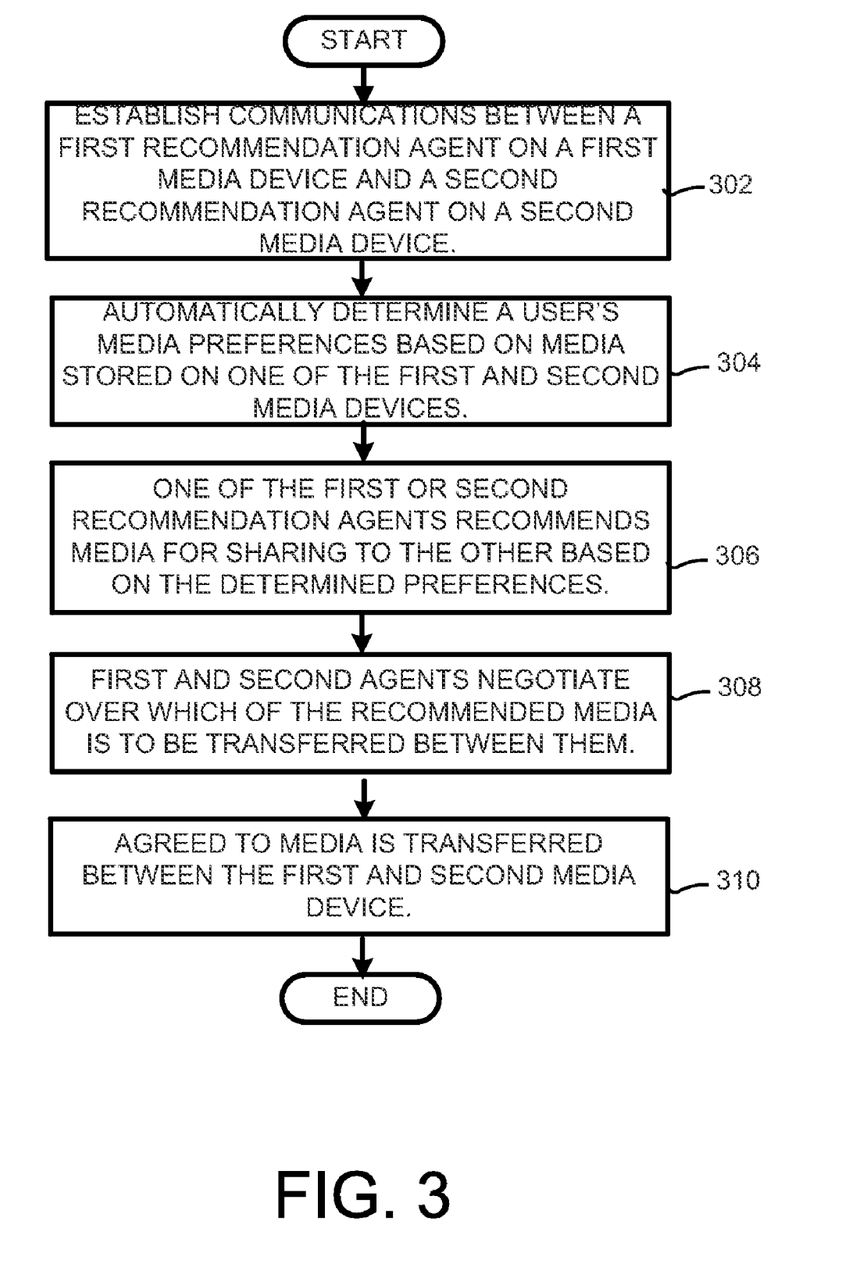
FIG. 3 is a general flow diagram depicting one exemplary embodiment of a process employing the present collaborative media recommendation and sharing technique.

One general exemplary embodiment of a process employed by the present media recommendation and sharing technique is shown in FIG. 3. In this embodiment, a first recommendation agent on a first computing device such as a media player establishes communications with the recommendation agent on a second computing device (e.g., media player) (box 302). A user's media preferences are automatically and contemporaneously determined for the user of at least one of the first and second computing devices based on the media stored on the first and second computing devices (box 304). One of the first or second recommendation agents recommends media for sharing between the two devices to the other agent based on the determined preferences (box 306). The first and second agents (of the first and second devices, respectively) negotiate over which of the recommended media is to be sent from one device to the other (box 308). The media is sent between the first and second devices based on the media that is determined to be transferred based on the results of the negotiation (box 310).

Figure 4:
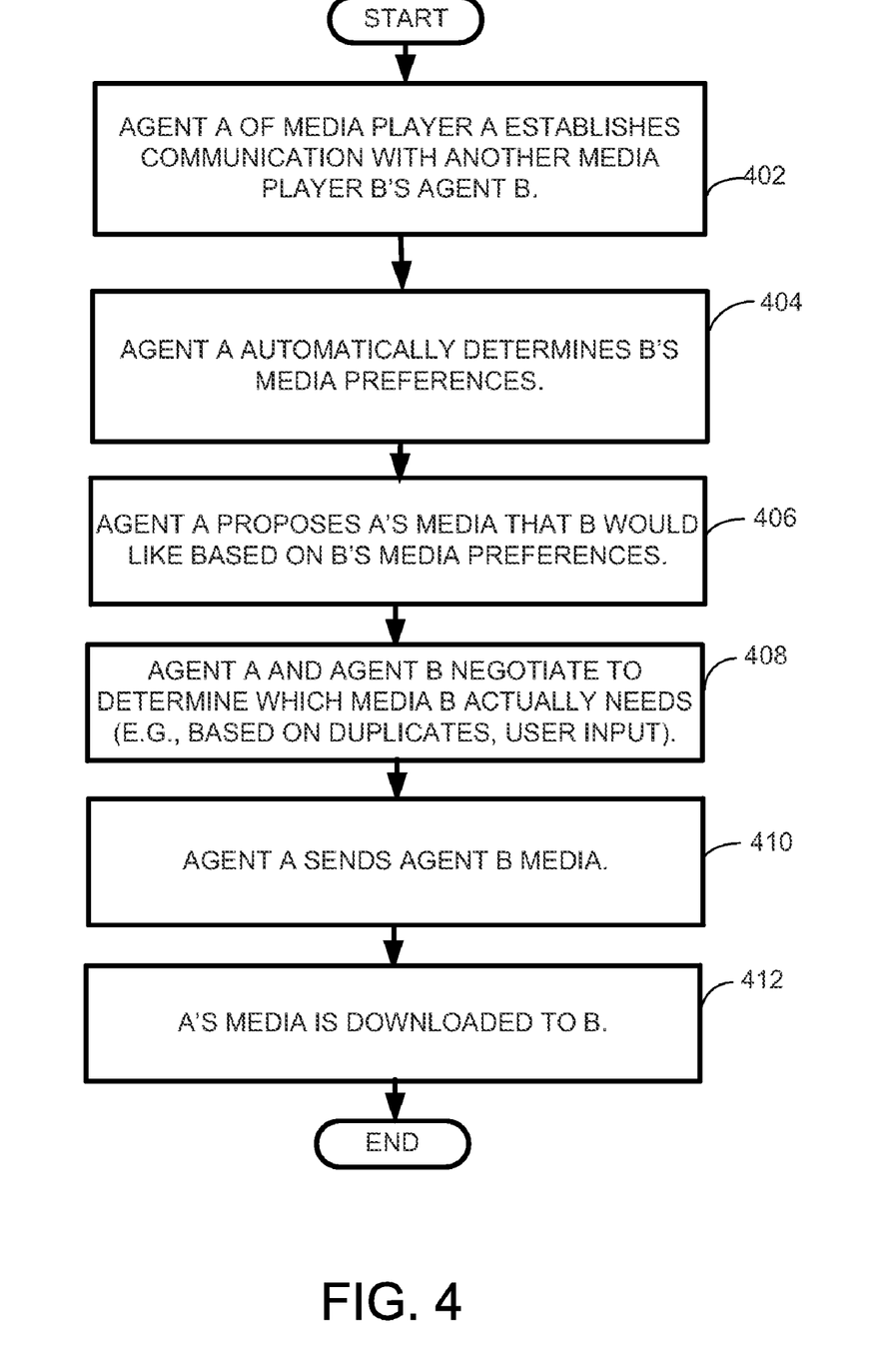
FIG. 4 is a more detailed flow diagram depicting one exemplary embodiment of a process employing the present collaborative media recommendation and sharing technique.

More particularly, FIG. 4 depicts a more specific exemplary embodiment of a process employing the present collaborative media recommendation and sharing technique. As shown in box 402, the recommendation agent of a first media player, for purposes of illustration termed agent A and media player A herein, establish communication with the recommendation agent (termed agent B) of another media player B. Agent A then automatically and contemporaneously determines the media preferences of user B (associated with media player B), preferably based on the media items media player B has stored (box 404), and recommends media player A's media to user B based on these determined preferences (box 406). Various methods on how this can be done are discussed in the paragraphs that follow. Agents A and B then negotiate to determine which media B actually needs (for example, media player B might already have some of the media A is recommending, or may only wish to receive recently released media, or user B may not wish to download some of the recommended media) (box 408). Agent A then sends Agent B the desired media (box 410), and the recommended media is automatically forwarded and downloaded to player B (boxes 410, 412).

2.4 Recommendation Based on Media Access Patterns

Figure 5:
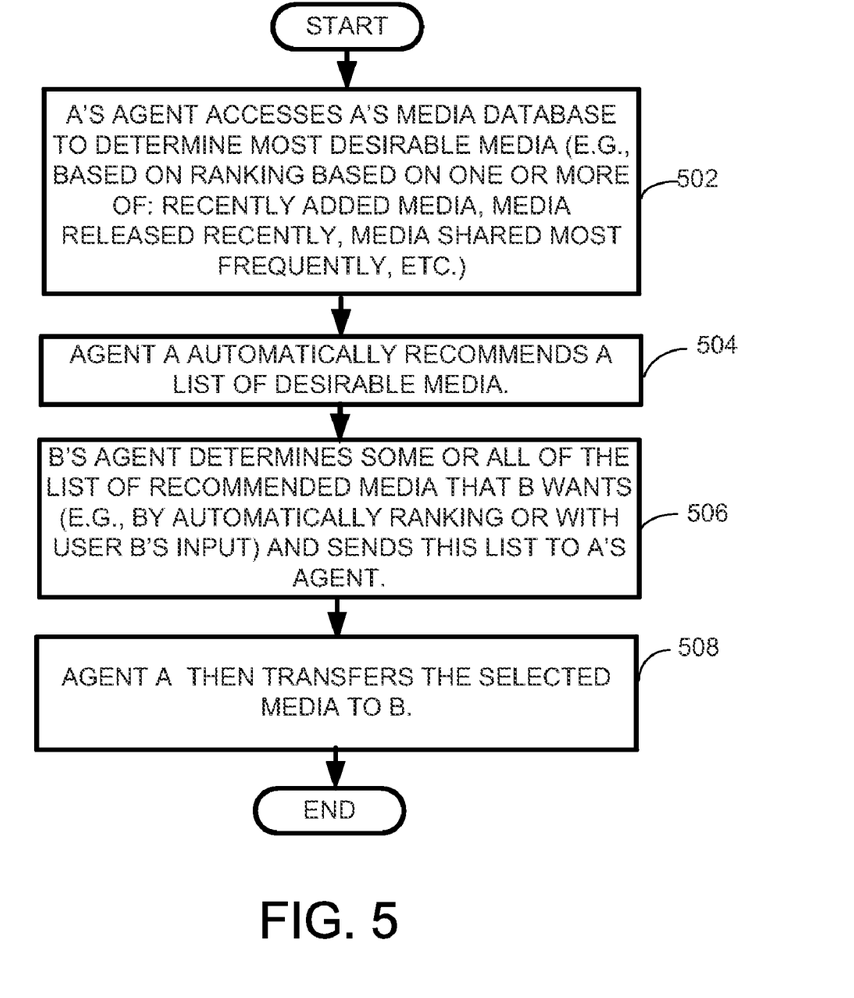
FIG. 5 is a flow diagram depicting another exemplary embodiment of a process employing the present collaborative media recommendation and sharing technique wherein a user's media preferences and recommendations are determined by user media access patterns.

In one embodiment of the present collaborative media recommendation and sharing technique user preferences are determined based on a user's media access patterns. For example, as shown in FIG. 5, A's agent accesses A's media database to determine a list of the most desirable or "hot" media (e.g., songs) on the player (box 502). These could be, for example, recently added media, most listened to media, media released recently or even the media shared with others most often. All these factors can be used to rank the media items and ones with a higher ranking can be considered "hot". A's recommendation agent on A's media player recommends a few "hot" or desirable media items to B's media player (box 504) (for example, the list of hot media can show up on the screen of B's media player). B's agent then determines some or all of the list of recommended hot media items that B wants (e.g., automatically by ranking or with User B's input) and sends this list to A's agent (box 506). Agent A then transfers the selected media items to B's player (box 508).

2.5 Recommendation of Randomly Selected Media

Figure 6:
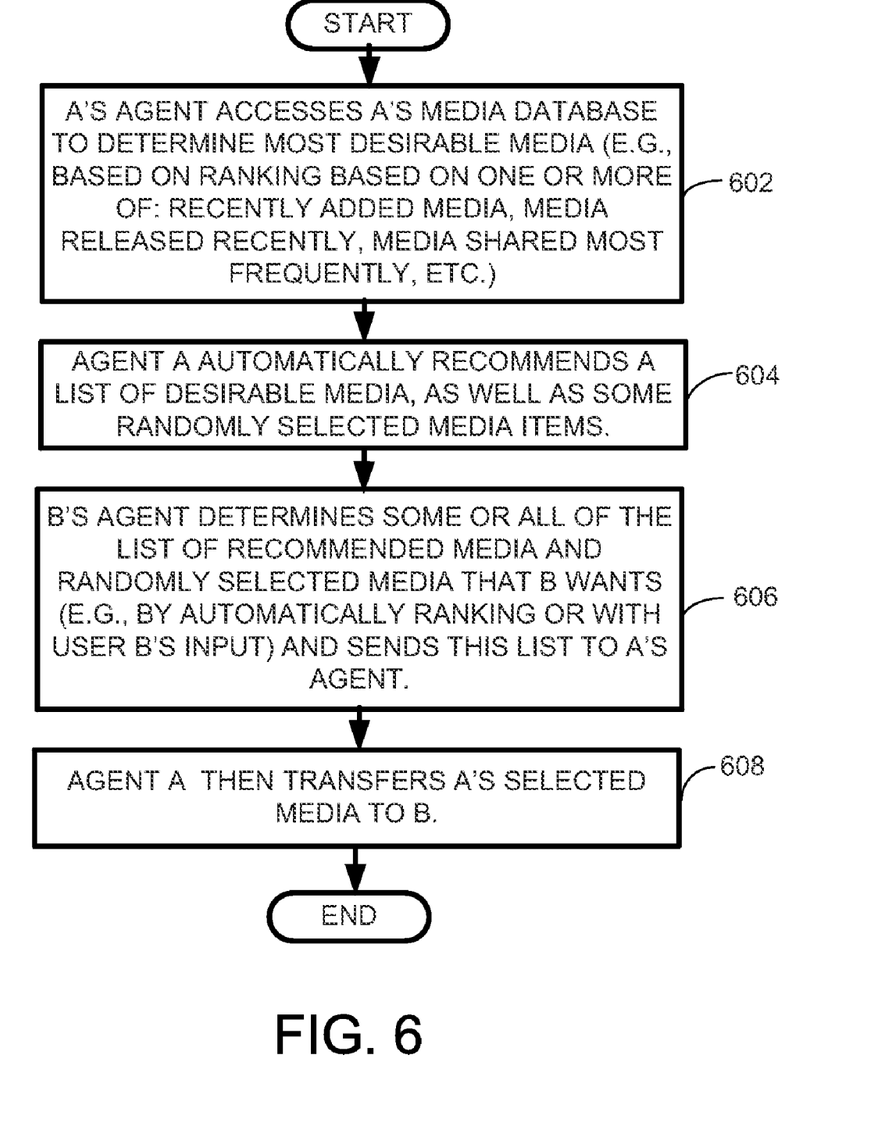
FIG. 6 is a flow diagram depicting another exemplary embodiment of a process employing the present collaborative media recommendation and sharing technique wherein media sharing recommendations are determined randomly.

In one exemplary embodiment of the present collaborative media recommendation and sharing technique, in addition to the "hot" songs, A's agent also recommends some randomly selected songs. For example, as shown in FIG. 6, A's agent accesses A's media database to determine a list of the most desirable or "hot" media (e.g., songs) on the media player (box 602), as described above with respect to FIG. 5. Agent A's recommendation agent then recommends a few "hot" media items to B's media player (box 604) (for example, the list of hot media can show up on the screen of B's media player) along with the randomly selected media items. B's agent determines some or all of the list of recommended media items that B wants (e.g., automatically by ranking or with User B's input) and sends this list A's agent (box 606). Agent A then transfers the selected media to B's player (box 608). It should be noted that it is also possible to recommend only randomly selected media items, without recommending the ranked list of hot or desirable media items on A's device.

2.6 Recommendation by Media Matching Between Devices

Media matching (correlating the media resident on two separate media devices with a user's media preferences), which is used in some embodiments of the present collaborative media recommendation and sharing technique, can occur based on many different types of data and based on several different techniques. Some of the matching techniques are discussed below.

In general, in one exemplary embodiment of the present collaborative media recommendation and sharing technique, each agent on a media player keeps some data on their respective user's media interests. In this embodiment, when two users start the process of media sharing, the data on the user's media interest is also shared. For example, recommendation agent A can send this interest data to B's agent, while B's recommendation agent can send B's interest data to A. On receiving this data the receiving recommendation agent maps the media items it has into the "interest space" of the receiving device. Once mapped, an agent can pick the media items that fall in certain regions of the interest space and recommend those, for example, in the form of a list, to the agent on the other's media player. Upon receiving the list, the receiving recommendation agent or the user of the receiving device can pick a subset or all of these and the sharing process can continue from there as discussed previously.

In one embodiment of the present collaborative media recommendation and sharing technique, to map interest spaces between devices, the present collaborative media sharing and recommendation technique keeps a correlation score between each pair of media titles in the data stores of two separate media players. This correlation score indicates how likely a user will like media B given that this person already has media A. In one embodiment, such a correlation score can be obtained from two types of information. The first type of information is the metadata associated with each media item, for example, the title, band, genre, type of media, and so on. This metadata for a media item can automatically be associated with the media item or can be manually entered by a user. Two media items can be considered highly correlated if they have similar metadata. In one embodiment, similarity between metadata is determined by automatically mapping the metadata for each media item into a multi-dimensional vector, and computing the Euclidean distance between the multi-dimensional vectors corresponding to the metadata. This measure of similarity is more specifically discussed in a co-pending U.S. patent application entitled "Constructing a Table of Music Similarity Vectors from a Music Similarity Graph" having application Ser. No. 10/993,109 and being filed on Nov. 19, 2004, which is incorporated herein by reference. Two media items have similar metadata, and hence can be considered highly correlated, if the Euclidean distance between their multi-dimensional vectors is small. The second type of information associated with a media item is the usage information, for example, what media items users have purchased, what media items they have accessed repeatedly, what media items they have shared, what media items they have rated high, and what media items they have rated low. If many people have bought/accessed/shared/liked both media item A and media item B, then media items A and B can be considered highly correlated. One way to measure correlation in this case is to estimate the joint probability distribution between whether a user has bought/accessed/shared/liked media items A and B, and to compute the correlation coefficient. For example, let X (respectively Y) be a random variable that is equal to 1 if a user has bought/accessed/shared/liked media item A (respectively B) and is equal to 0 otherwise. (In another embodiment, X and Y represent the rating, for example, from 1 to 5 stars, that a user gives to media items A and B.) The joint probability distribution $p(x, y)$ of X and Y can be estimated as $n(x,y)/N$, where $n(x,y)$ is the number of users out of a total of N users for whom it is known that X=x and Y=y. Then the correlation coefficient can be computed as $E[(X-EX)(Y-EY)]/[E(X-EX)^2 E(Y-EY)^2]^{1/2}$, where E denotes expectation with respect to $p(x,y)$. It is assumed that if a user has bought/accessed/shared/liked media item A, then it is probable that this user will also like media item B, if it is highly correlated with media item A. In one embodiment, correlation scores are received from a "universal agent" that knows the correlation scores between all pairs of media data. In this embodiment, when a media player is connected to such a "universal agent" (for example, this could a media store server), the correlation data is downloaded to the player.

Note that the first type of information, the media metadata, is relatively static and can be pre-built into the correlation model and database of the recommendation agent, while the second type of information, the usage information, may need frequent updates, such as, for example, from a service. In one embodiment, updates are performed whenever the user is connected to a media downloading server, for example as is shown FIG. 2.

Figure 7:
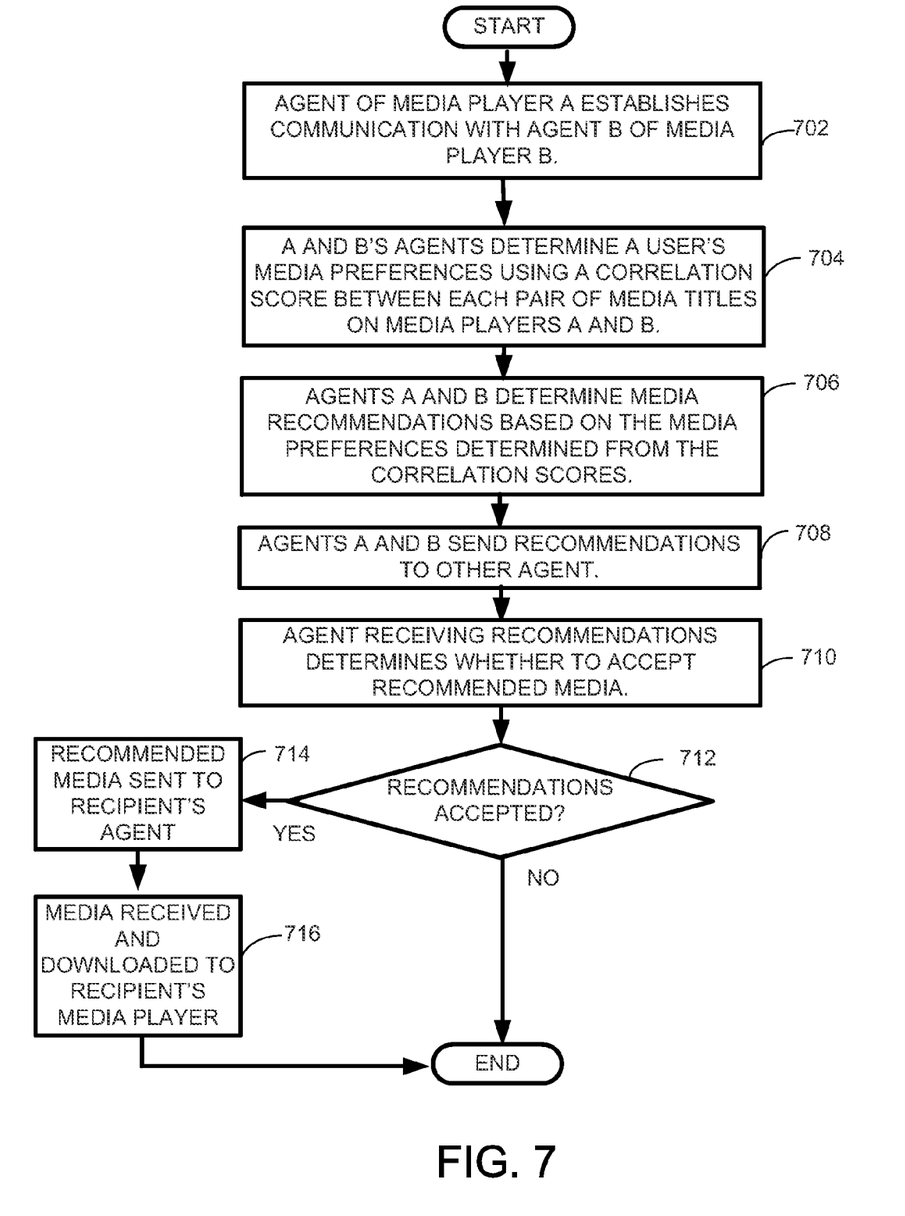
FIG. 7 is a flow diagram depicting another exemplary embodiment of a process employing the present collaborative media recommendation and sharing technique wherein a user's media preferences and recommendations are determined by media matching by correlating media metadata and usage data between devices.

More particularly, FIG. 7 depicts an embodiment of the present collaborative media recommendation and sharing technique where media metadata and usage data is used to determine user preferences and make recommendations on media items to be shared based on these preferences. As shown in box 702, agent A of media player A establishes communications with agent B of media player B. Agent A and agent B determine a user's media preferences using a correlation score between each pair of media items on media player A and media player B (box 704). Agents A and B determine media recommendations based on the user's media preferences determined using the correlation scores (box 706). Agents A and B send the determined media recommendations to the other agent (box 708). The agent receiving the determined media recommendations determines whether to accept all or some of the recommended media (box 710). If some or all of the recommendations are accepted, the recommended media is sent and downloaded to the accepting media player (boxes 712, 714, 716). If not, the process terminates. It should be noted that while this flow chart shows the agent of each device making recommendations to the other, the process can be implemented with only one recommendation agent making recommendations.

Figure 8:
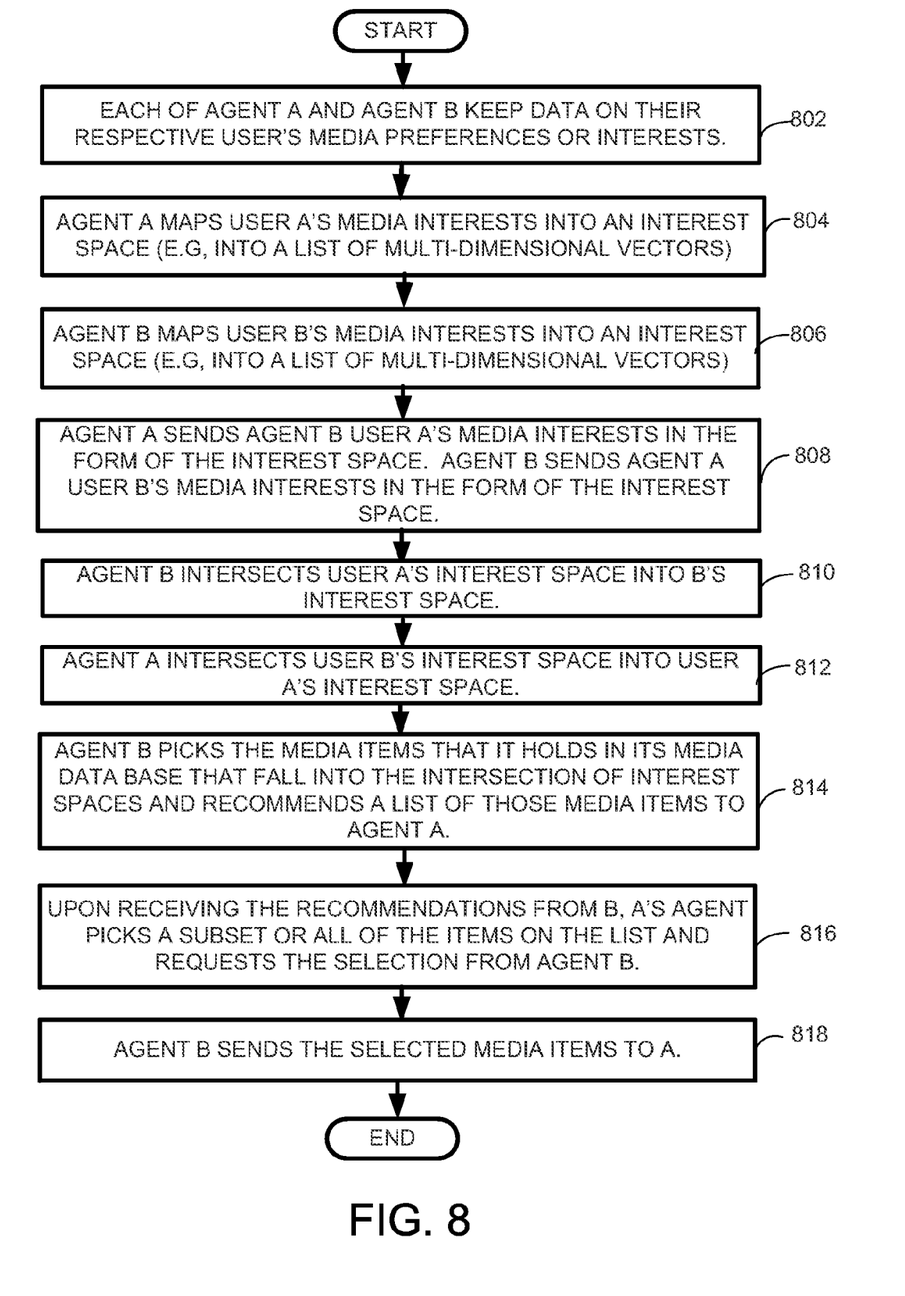
FIG. 8 is a flow diagram depicting another exemplary embodiment of a process employing the present collaborative media recommendation and sharing technique wherein a user's media preferences and recommendations are determined by media matching using vectors to map a user's interest space.

Another exemplary embodiment of the present collaborative media recommendation and sharing technique that employs media matching is shown in FIG. 8. This exemplary embodiment employs a method of mapping media items to an interest space. The interest space for a user can be determined by the union of Euclidean balls of a given radius around the multi-dimensional vectors associated with all of the media items that the user has bought/accessed/shared/liked. As shown in FIG. 8, box 802, each of agent A and agent B keeps data on their respective user's media preferences or interest space. Agent A maps user A's media items into an interest space represented by a list of multi-dimensional vectors (box 804). Similarly, Agent B maps user B's media items into an interest space represented by a list of multi-dimensional vectors (box 806). Agent A sends agent B A's interest space (e.g., its multi-dimensional vectors) (box 808). Agent B intersects A's interest space with B's interest space (box 810). Agent A intersects B's interest space with A's interest space (box 812). Agent B picks the media that it holds in its media database that fall into the intersection of interest spaces and recommends a list of those media items to agent A (box 814). Upon receiving the recommendations from B, A's agent picks a subset or all of the media items on the list and requests this selection from agent B (box 816). Agent B then sends this selected media to agent A (box 818).

Alternately, in yet another embodiment of the present technique, correlation between interest spaces or user preferences can be based on probabilistic methods. For example, a Bayesian network can be used to determine the correlation between interest spaces. In this instance, every media item can be rated with a score of 1 to 5 and the probability that a media item is given a certain ranking given the ranking of another media item can be determined.

2.7 Recommendation by Pulling

Figure 9:
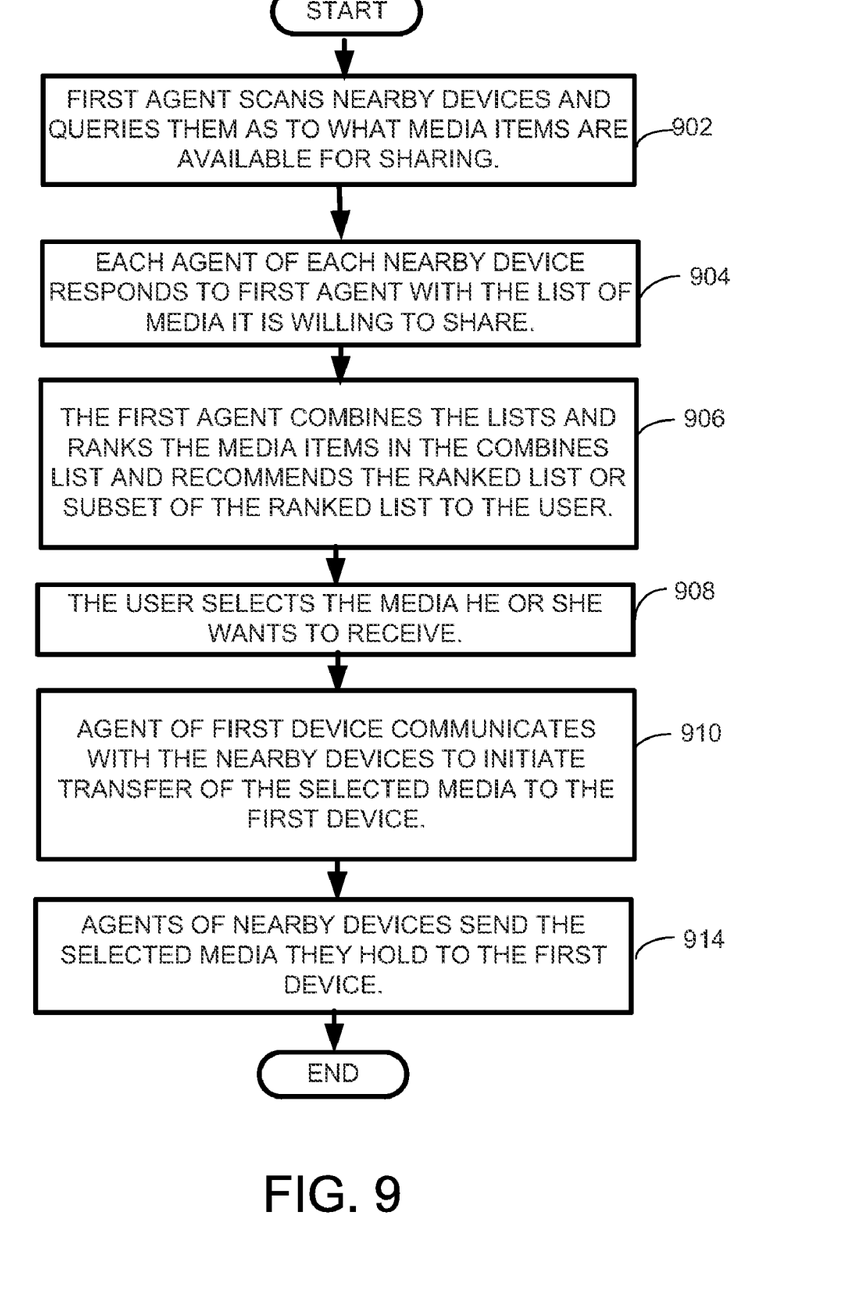
FIG. 9 is a flow diagram depicting another exemplary embodiment of a process employing the present collaborative media recommendation and sharing technique wherein a user's media preferences and recommendations are determined by pulling.

In general, in one embodiment of the present collaborative media recommendation and sharing technique shown in FIG. 9, an agent of a first device scans nearby devices and asks each device what media (e.g., songs) are available for sharing (box 902). This is called making a recommendation by pulling. The agent of each nearby device then responds with the list of media (such as, for example, songs) that it is willing to share box 904). The receiving agent ranks this list based on its space of interest and recommends this ranked list to the user (box 906). The user then selects the media he/she wants to view/listen to (box 908) and the agent then communicates with the nearby devices to transfer the media that the user has selected (910). It should be noted that the roles of first and nearby agents can be reversed. For example, an agent of a nearby device can scan the first device and recommend possible media to transfer from the first device to that given nearby device.

The immediate benefit of the recommendation agents described herein is that their implementation significantly increases the amount of sharing activities between media device users because the agents will help the users to discover significantly more sharing targets. Furthermore, media sharing between strangers and media sharing between a store and its customers is enabled. Additionally, the recommendation agents employed can help to facilitate social interactions and social networking.

3.0 Alternate Embodiments

It should also be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Many variations to the details of the embodiments described herein can be implemented. For example, in one embodiment of the present technique the agent on a media device can scan another device, show a list of media on that device to a user and allow this user to manually make recommendations of media from the user's device based on viewing the media stored on the other device. In yet another embodiment the present technique can be used as a social networking tool by notifying a user that another nearby user has common media interests. The specific features and acts described above are disclosed as example forms of implementing the claims.

Wherefore, what is claimed is:

1. A computer-implemented process for recommending media stored on a first media device to a second media device, comprising:

establishing communications between a first recommendation agent on a first associated media device and a second recommendation agent on a second associated media device, wherein each of said first recommendation agent and said second recommendation agent are configured for recommending media items stored on the first media device or the second media device to the other recommendation agent, and wherein each recommendation agent is permanently located on its associated media device and has a recommendation engine which computes a user's interest space by using a correlation model that contemporaneously correlates information as to the user's media preference and stores this information in a database, both the correlation model and the database being part of the associated recommendation agent permanently located on the associated media device;

wherein each of the first recommendation agent and the second recommendation agent map their respective user's media preferences into an interest space that defines that user's media preferences and uses the mapped interest spaces in determining which media items to recommend;

wherein the interest spaces are determined by multi-dimensional vectors associated with all of the media items the user has preferred;

automatically determining a user's media preferences for a user of the first media device or a user of the second media device;

one of the first recommendation agent and the second recommendation agent recommending media for sharing in the form of a candidate list that a user can verify before transferring the media to the other recommendation agent based on the determined user's media preferences;

displaying the candidate list of recommended media for sharing to a user; and the user, to whom the candidate list is displayed, specifically selecting particular recommended media items from the displayed candidate list for transfer to the selecting user's media device.

2. The computer-implemented process of claim 1 further comprising:

the first and second recommendation agents negotiating over which of the recommended media items are to be transferred between the first and second media devices.

3. The computer-implemented process of claim 2 further comprising:

transferring only the particular user-selected media items of the recommended media items between the first and second media device.

4. The computer-implemented process of claim 1 wherein the first recommendation agent determines the user media preferences of the user of the second media device, and wherein the first recommendation agent proposes media items on the first device based on the user media preferences of the user of the second media device.

5. The computer-implemented process of claim 1 wherein the first recommendation agent accesses the media items on the first media device, determines the most desirable media on the first media device as the media preference of the user of the first device and recommends the most desirable media to the second recommendation agent.

6. The computer-implemented process of claim 5 wherein the most desirable media is based on a ranking based on one or more of:

recently added media items;
media items consumes most often;
media items recently released; and
media shared most frequently.

7. The computer-implemented process of claim 1 wherein one of the first and second recommendation agents recommends media for sharing to the other recommendation agent by randomly selecting media items in addition to recommending media items based on the determined media preferences.

8. The computer-implemented process of claim 1 wherein communications between the first recommendation agent and the second recommendation agent are automatically established.

9. The computer-implemented process of claim 1 wherein the user's media preferences are contemporaneously determined based on the media items stored on the first and second media device.

10. A system for recommending and sharing media between media devices, comprising:

a first associated media device having a memory and a second associated media device having a memory;

establish communications between a first recommendation agent on the first associated media device and a second recommendation agent on the second associated media device, wherein each of said first recommendation agent and said second recommendation agent are configured for recommending media items stored in a media store on one of the first or second media devices to the other recommendation agent, and wherein each recommendation agent is permanently located on its associated media device and has a communication control module and a recommendation engine which computes a user's interest space by using a correlation model that contemporaneously correlates information as to the user's media preferences and stores this information in the database, both the correlation model and database being part of the associated recommendation agent permanently located on the associated media device;

wherein each of the first recommendation agent and the second recommendation agent map their respective user's media preferences into an interest space that defines that user's media preferences and uses the mapped interest spaces in determining which media items to recommend;

wherein the interest spaces are determined by multi-dimensional vectors associated with all of the media items the user has preferred;

automatically determine a user's media preferences related to a user of the first media device or the second media device corresponding as a user's media device;

recommending in the form of a list, to be approved by a user, media items for sharing by one of the first recommendation agent and the second recommendation agent to the other recommendation agent based on the determined media preferences before transferring recommended media items;

displaying the list of recommended media items to the user;

the user selecting particular ones of the recommended media items from the list for transfer to the user's media device; and transferring only the particular ones of the user-selected media items from the list of the recommended media items between the first media device and second media device after approval by a user.

11. The system of claim 10 wherein the user's media preferences are determined by determining a correlation score that correlate a user's preference for one type of media item with a preference for another type of media.

12. The system of claim 10 wherein the user's media preferences are determined by using metadata of the media items stored on the first and second media devices and the user's media item access information.

13. The system of claim 10 wherein communications between the first recommendation agent on the first media device and the second recommendation agent on the second recommendation device are conducted on a limited range wireless network.

14. The system of claim 13 wherein the limited range wireless network uses a WiFi or Bluetooth protocol.

15. A computer-implemented process for recommending and sharing media between media devices, comprising:

a first recommendation agent on a first media device querying nearby media devices over a limited range wireless network to determine what media items the nearby media devices have available for sharing, wherein the first recommendation agent is permanently located on the first media device and has a recommendation engine which computes a user's interest space by using a correlation model that contemporaneously correlates information as to the user's media preferences and stores this information in a database, both correlation model and database being part of the first recommendation agent permanently located on the first media device;

wherein each of the first recommendation agent and the second recommendation agent map their respective user's media preferences into an interest space that defines that user's media preferences and uses the mapped interest spaces in determining which media items to recommend;

wherein the interest spaces are determined by multi-dimensional vectors associated with all of the media items the user has preferred;

an agent of each of the nearby media devices responding to the querying of the first recommendation agent on the first media device with a list of media items available for sharing;

the first recommendation agent on the first media device combining the lists and ranking the media items in the combined list;

the first recommendation agent on the first media device recommending some or all of the ranked media items in the combined list to a user;

displaying the ranked combined list of media items to the user;

the user explicitly selecting particular media items in the displayed ranked combined list that the user wants to receive;

the user requesting the selected media items from the displayed combined list from the nearby media devices before transferring the user-selected media items;

the first recommendation agent of the first media device communicating with the nearby media devices to request transfer of the user-selected media items that the user wants to receive from the nearby media devices; and agents of the nearby media devices sending only the user-selected requested media items they hold to the first media device.

16. The computer-implemented process of claim 15 further comprising an agent of a nearby media device scanning the first device and recommending to the agent of the nearby media device media to transfer from the first device.

17. The computer-implemented process of claim 15 wherein the media items on the nearby media devices can be marked as not available for sharing.

* * * * *